(12) United States Patent
Takeshita et al.

(10) Patent No.: US 6,773,782 B2
(45) Date of Patent: Aug. 10, 2004

(54) MAGNETIC MEMORY MEDIUM HAVING A MAGNETIC FILM LAMINATED ON A SUBSTRATE AND A NON-MAGNETIC FILM FORMED THEREON, AND METHOD OF MANUFACTURING THE SAME

(75) Inventors: Hiroto Takeshita, Isehara (JP); Wataru Yamagishi, Ebina (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/990,131

(22) Filed: Nov. 21, 2001

(65) Prior Publication Data

US 2002/0055018 A1 May 9, 2002

Related U.S. Application Data

(63) Continuation of application No. PCT/JP99/02881, filed on May 28, 1999.

(51) Int. Cl.$^7$ .............................. G11B 5/73; G11B 5/82
(52) U.S. Cl. ...................... 428/64.2; 428/65.3; 428/156; 428/161; 428/163; 428/167; 428/694 TS; 428/694 TG; 369/13.55; 369/275.4; 369/277; 360/133
(58) Field of Search .............................. 369/277, 275.4, 369/13.55; 360/133; 428/694 ST, 694 SG, 156, 161, 163, 167, 64.2, 64.3, 64.5, 65.3, 694 ML, 694 T, 694 TR (56) References Cited

U.S. PATENT DOCUMENTS

| | | | |
|---|---|---|---|
| 5,313,357 A | * 5/1994 | Ohta et al. ................. | 360/134 |
| 5,372,843 A | * 12/1994 | Miyamura et al. .......... | 427/130 |
| 5,820,969 A | * 10/1998 | Satoh ......................... | 428/141 |
| 5,846,626 A | * 12/1998 | Kashiwagi et al. ........ | 369/275.4 |
| 5,955,168 A | * 9/1999 | Min et al. ................... | 369/275.4 |
| 5,999,360 A | * 12/1999 | Meyer et al. ............... | 360/77.02 |
| 6,583,957 B1 | * 6/2003 | Takeshita et al. ........... | 360/135 |

FOREIGN PATENT DOCUMENTS

| | | | |
|---|---|---|---|
| JP | 61-024021 | | 2/1986 |
| JP | 61-280026 | | 11/1986 |
| JP | 1-292625 | | 11/1989 |
| JP | 02-120640 | | 5/1990 |
| JP | 02-278514 | | 11/1990 |
| JP | 02-278514 A | * | 11/1990 |
| JP | 04-251435 | | 9/1992 |
| JP | 5-81640 | | 4/1993 |
| JP | 07-190745 | | 7/1995 |
| JP | P2000-195042 A | * | 7/2000 |

OTHER PUBLICATIONS

JPO Abstract Translation of JP 2000-195042 A (Doc. ID: JP 2000195042 A).*
English Translation of JP 04-251435-A.*
JPO Abstract Translation of JP 01-292625-A (JPO Pub. No. 01-292625).*
JPO Abstract Translation of JP 61-280026-A (JPO Pub. No. 61-280026).*
Derwent Abstract Translation of JP 04-251435-A (Derwent Acc. No. 1992-345755).*
Machine Translation of JP-09-044843-A.*
JPO Abstract Translation of JP 63-273230-A (JPO Pub. No. 63-273230).*
JPO Abstract Translation of JP 04-251435-A (JPO Pub. No. 04-251435).*

* cited by examiner

*Primary Examiner*—Ramsey Zacharia
*Assistant Examiner*—Kevin Bernatz
(74) *Attorney, Agent, or Firm*—Greer, Burns & Crain, Ltd.

(57) ABSTRACT

The surface of a disk medium includes a substrate whose surface includes grooves and lands. A non-magnetic underlayer and a magnetic recording layer are formed on the substrate. Smoothing non-magnetic film fills the grooves, which are covered with the non-magnetic underlayer and the magnetic recording layer, so that the height of the magnetic recording layer above the grooves may reach the same level as the height of the magnetic recording layer above the lands.

11 Claims, 13 Drawing Sheets

FIG.1 (a)

PRIOR ART

FIG.1 (b)

PRIOR ART

LEVEL DIFFERENCE

| (nm) | FLOTATION DURATION TIME |
|---|---|
| 2.2 | 1000 HOURS OR LONGER |
| 4.8 | 1000 HOURS OR LONGER |
| 9.6 | WITHIN 4 HOURS |
| 23.7 | WITHIN 2 HOURS |

FIG. 12

LEVEL DIFFERENCE

| (nm) | FLOTATION DURATION TIME |
|---|---|
| RELATED ART FIG. 1(b) | WITHIN 2 HOURS |
| RELATED ART FIG. 1(a) | 1000 HOURS OR LONGER |

FIG. 13
PRIOR ART

MAGNETIC MEMORY MEDIUM HAVING A MAGNETIC FILM LAMINATED ON A SUBSTRATE AND A NON-MAGNETIC FILM FORMED THEREON, AND METHOD OF MANUFACTURING THE SAME

This is a continuation of International PCT Application No. JP99/02881 filed May 28, 1999, which was not published in English.

BACKGROUND OF THE INVENTION

1. Field of the Invention

The present invention relates to a magnetic memory medium to be applied to a hard disc drive and a method of manufacturing the same medium.

In recent years, a hard disc drive playing the centric role of an information memory apparatus is requested to assure reduction in size and enhancement in the storage capacity. These requests can be realized with improvement in the surface recording density of a magnetic disc medium. The surface recording density includes the line recording density in the circumference direction of the disc medium and the track density in the radius direction thereof. Therefore, higher surface recording density can be attained with improvement in any one density or both densities explained above. The present invention particularly relates to the technique to contribute to improvement in the track density.

2. Description of the Related Art

In the related art technique, there is provided a magnetic disc medium 60 by forming an underlayer film 3 with formation, as illustrated in FIG. 1(a), of a chromium layer on a non-magnetic substrate 2 such as aluminum substrate, forming a magnetic film 4 consisting of an alloy mainly composed of cobalt on the underlayer film 3 and also forming a protection film 6 such as amorphous carbon on the magnetic film 4.

In order to enhance track density of a magnetic disc medium, it is necessary to reduce the recording track width by narrowing the core width of a recording magnetic head. However, in the system utilizing a magnetic head for recording of information, extra-recording is conducted to the region (guard band) between the recording tracks with a leakage field generated from the side surface of the recording head. Such extra-recorded region is called the side erase which will become a cause of noise during the reproducing operation. Moreover, even when the core width of the recording magnetic head is narrowed by improving track density, since the width of side erase does not particularly change if the gap length and head flotation amount are not reduced, it is difficult, due to reduction of track width, to acquire the S/N ratio while reproducing the recorded data.

Therefore, as illustrated in FIG. 1(b), there is proposed a disc medium 61 wherein a groove 9 is previously formed along the circumferential direction of a disc substrate 2 and then it is used as a guard band to physically isolate the track. The magnetic disc medium 61 is considered very effective for realizing higher density of the track because the track edge noise can be controlled when the groove has sufficient depth.

However, on the medium on which the groove is formed, an uneven surface having a level difference of several tens of nm to several hundreds of nm is finally left on the surface. When considering the future trend of the magnetic disc medium indicating that the flotation of the magnetic head becomes 30 nm or less with enhancement of density of the magnetic disc medium, a problem of reliability will occur due to the reason explained below.

In the hard disc drive, high speed revolution of disc generates air flow to float a slider mounting a magnetic head and thereby the magnetic head executes the data recording and reproducing operations through non-contact with the disc. However, it is known that if the disc has an uneven surface, the flotation amount of the slider varies to become unstable depending on disturbance of an air flow. This fact has been neglected when the flotation amount is comparatively as large as 50 nm to 100 nm, but it becomes a major problem when the flotation of slider is as small as 30 nm or less which will be required in the future.

OBJECT AND SUMMARY OF THE INVENTION

Therefore, an object of the present invention is to provide a magnetic recording medium which assures higher recording density.

Moreover, another of object of the present invention is to reduce the track edge noise of the magnetic recording medium.

In addition, the other object of the present invention is to realize stable floating of a magnetic head.

In the magnetic recording medium of the present invention, groove and land are formed on a substrate and a magnetic film is laminated on this substrate. Therefore, tracks are magnetically isolated to reduce the track edge noise. Moreover, on the magnetic film on the groove, a non-magnetic material is deposited up to a position higher than the land surface on the substrate. According to this structure, a level difference resulting from the land and groove of the substrate is reduced at the surface of the medium and thereby the medium surface becomes almost flat. Therefore, the air flow generated by revolution of the medium is never disturbed and thereby stable floating of the magnetic head for recording or reproducing information to or from the magnetic recording medium can be assured.

Moreover, in the present invention, after a magnetic film and a non-magnetic film are sequentially laminated on the substrate on which groove and land are formed, a non-magnetic film is fused through the heat process. Thereby, a non-magnetic material fuses on the groove to deposit a non-magnetic material on the groove. As a result, level difference between the groove and land is reduced on the medium surface to attain flatness of the medium surface. Here, the problem that the other materials are also fused when the non-magnetic material is heated can be eliminated by introducing, as the material of non-magnetic film, a material having the melting point lower than that of the other materials forming the magnetic recording medium. Moreover, when a non-magnetic material film laminated on the land is fused and thereby eliminated from the land, the groove is perfectly filled with the non-magnetic material film and a flat surface of the medium can be attained without leaving extra non-magnetic film on the land by laminating the non-magnetic film in the depth of groove width/land width×groove depth.

DESCRIPTION OF THE PREFERRED EMBODIMENTS

Figure 2:
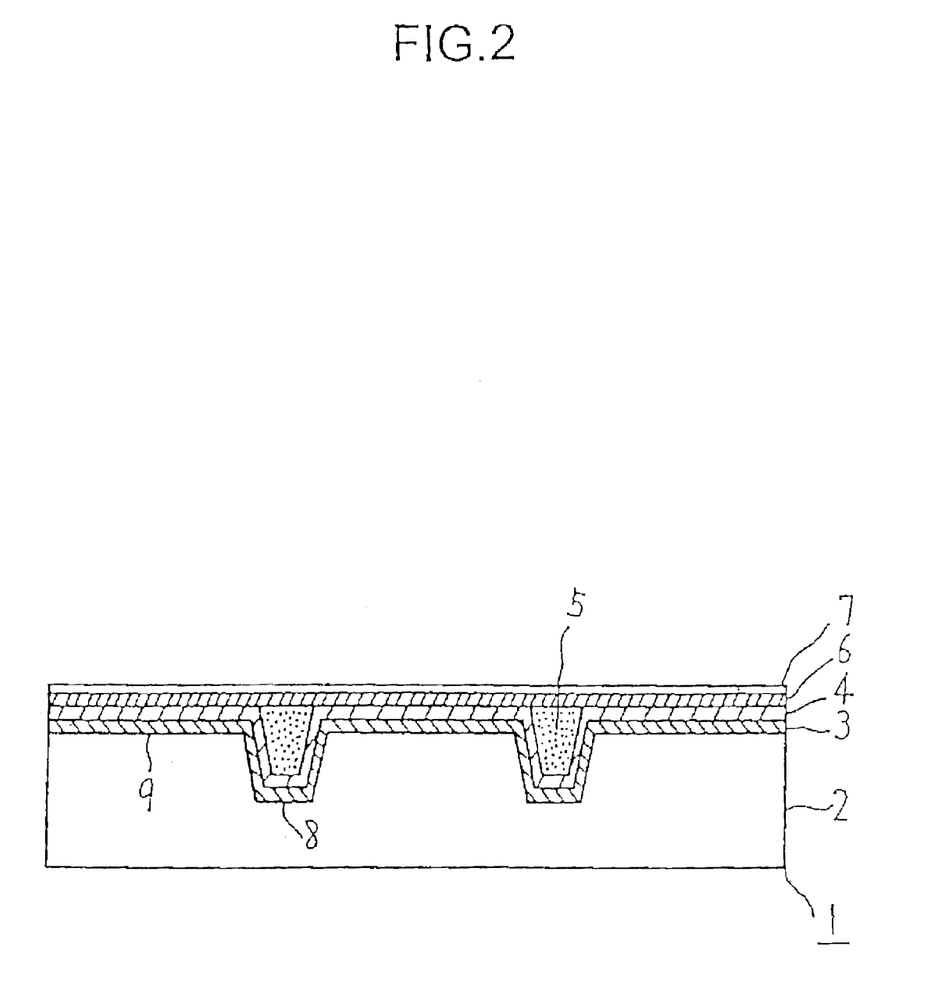
FIG. 2 is a cross-sectional view of a disc medium of the present invention.
Figure 3:
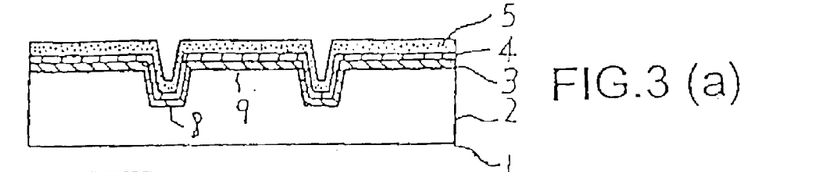
FIGS. 3(a)–3(g) are diagrams illustrating the process for smoothing the surface of the disc medium.

FIG. 2 illustrates a cross-section of a magnetic recording medium 1 of the present invention. Namely, an underlayer film 3, a magnetic film 4 and a protection film 6 are sequentially laminated on a substrate 2 where a groove 8 and a land 9 are formed and a layer of lubricant 7 is formed on the protection film 6. Moreover, on the groove 8, a thin film 5 for smoothing is deposited up to the height of the magnetic film 4 on the land 9 via the underlayer film 3 and magnetic film 4 to eliminate a level difference at the laminated surface of the protection film 6. Therefore, the upper layers above the protection film 6 are flat in shape. Each film forming the magnetic recording medium 1 will now be explained.

The substrate 2 is formed of a non-magnetic material in the shape of a disc. Materials forming the substrate 2 include NiP-plated aluminum (including aluminum alloy) disc, glass (including reinforced glass) disc, silicon disc having surface oxide film, SiC disc, carbon disc, plastic disc, ceramic disc or the like.

Various methods have been proposed for formation of groove and the optimum method will be introduced depending on the material of substrate. In the case where a substrate is formed of a resin like plastic, a method will be introduced, as an example, in which the fused plastic material is supplied to a die having the uneven shape and it is hardened to form a groove on the plastic substrate. Moreover, in the case where a substrate is formed of a metal material, a method will be introduced, for example, in which the area on the substrate other than the region on which the groove is formed is masked and the substrate surface is planed with the etching method such as ion milling to form the groove. In the case where a substrate is formed of glass material, methods will be introduced, for example, in which the fused glass material is supplied to the die having the uneven shape and it is then hardened to form the groove or in which a die having uneven shape is stamped to the ultraviolet hardening resin coated on one surface of glass plate and the other surface of glass plate is irradiated with the ultraviolet ray for hardening the resin in view of forming the groove.

The texture process is not always essential for the substrate 2. Moreover, the size of substrate 2 is determined depending on a kind of desired medium and a magnetic disc apparatus as the application object. In general, diameter is 1 to 3.5 inches and thickness is 0.5 mm to 1.0 mm.

The underlayer film 3 is composed of a non-magnetic metal material including chromium as the main material. As the more practical material, a metal material mainly formed of chromium or chromium alloy such as CrW, CrV, CrTi, CrMo or the like may be listed. The underlayer film 3 is formed, for example, with a sputtering method such as magnetron sputtering method or the like. Particularly, it is preferable that the film is formed under the application of a DC negative bias in order to enhance the coercive force. As the adequate film forming conditions, for example, the film forming temperature is set to 200° C. to 300° C., Ar gas pressure to 1 to 10 mTorr and the DC bias voltage to 100 to 500 V. Moreover, it is also allowed that the other film forming method, for example, vacuum evaporation method, ion beam sputtering method or the like may be substituted for the sputtering method. Thickness of the underlayer film 3 is determined within a wider range depending on various factors but it is preferable that thickness is set within the range from 10 nm to 100 nm in order to increase the S/N ratio. When thickness of underlayer film becomes 10 nm or less, a problem that sufficient magnetic characteristic cannot be obtained is generated and when thickness exceeds 100 nm, on the contrary, floating of head tends to become unstable.

The underlayer 3 is not always required, and it is also possible to introduce a structure wherein a magnetic film 4 is laminated on the substrate 2 not by way of the underlayer. Moreover, the underlayer 3 may also be formed in a multilayer structure.

The magnetic film 4 is formed of a Co-based magnetic material mainly composed of cobalt. As the practical materials, a Co-based binary alloy such as CoPt alloy, CoNi alloy, CoCr alloy or the like, a Co-based ternary alloy such as CoCrPt alloy or the like and a quaternary or quinary alloy in which Ta or Nb is added to CoCrPt may be listed. Composition example when CoCrPtTa, for example, is adapted to the magnetic film 4 will be explained below.

| Cobalt: | 70 to 80 at % |
|---|---|
| Chromium: | 10 to 30 at % |
| Platinum: | 5 to 20 at % |
| Tantalum: | 1 to 3 at % |

It is preferable that the magnetic film 4 is formed with a sputtering method such as the magnetron sputtering method or the like and as the adequate film forming condition, the example, the film forming temperature of 200° C. to 300° C. and Ar gas pressure of 1 to 10 mTorr or the like may be listed. Moreover, the other film forming methods, for example, the vacuum evaporation method, ion beam sputtering method or the like may also be listed in place of the sputtering method.

In this embodiment, the magnetic film 4 is formed of a single layer but two layers or multilayer structure in which each other is isolated may also be used as required. When the magnetic film 4 introduces the multilayer structure, the magnetic film 4 is separated into a plurality of magnetic layers via the non-magnetic intermediate layers. As the adequate non-magnetic intermediate layer, a CrMo is listed.

A thin film 5 for smoothing is formed of a non-magnetic material having the melting point lower than that of a material to form the magnetic film 4. The process to fill the groove with the smoothing thin film 5 will be explained with reference to FIG. 3 and FIG. 4.

First, as illustrated in FIG. 3(a), after the underlayer 3 and magnetic layer 4 are laminated on the substrate 2, a non-magnetic material is formed on the magnetic material 4, for example, with the magnetron sputtering method. When the magnetic film 4 has the multiplayer structure, the smoothing thin film 5 is formed on the layer upper than the upper most magnetic film. The desirable film forming conditions are that the film forming temperature is 20° C. to 50° C. and the gas pressure is 1 to 10 mTorr in the mixed gas of Ar:$CH_4$ is about 9:1.

Figure 4:
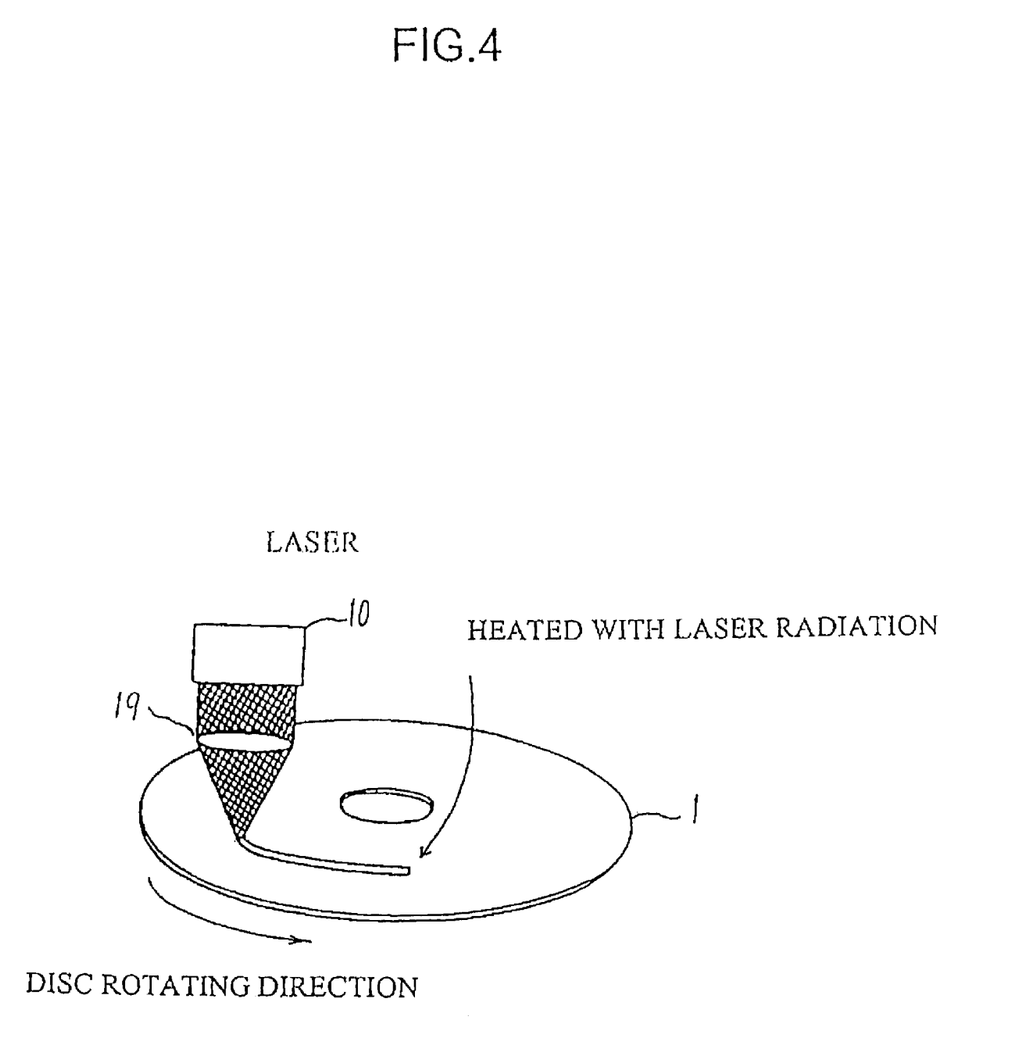
FIG. 4 is a diagram illustrating an apparatus for smoothing the surface of the disc medium.

After the formation of smoothing thin film 5, as illustrated in FIG. 4, the laser condensed with a lens 19 is radiated to the smoothing thin film 5 on the land while the medium 1 is rotated. The land and groove are concentrically formed on the substrate 2 and the smoothing thin film 5 is heated and fused along the circumferential direction of the medium 1 depending on rotation of the medium. As illustrated in FIG. 3(b) the laser spot diameter is adjusted to become equal the width of land. It is desirable that the laser wavelength is 400 nm to 800 nm and laser power is 2 to 100 mW.

When the smoothing thin film 5 on the land fuses, a difference is generated in the surface tensions between the smoothing thin film 5 on the land and the smoothing thin film 5 on the groove as illustrated in FIG. 3(c). As a result, the smoothing thin film 5 on the land flows into the groove located at the external side of the laser spot to fill the groove. When the film thickness of the smoothing thin film 5 is equal to (groove width/land width)×groove depth, the groove is perfectly filled with the smoothing thin film material when the smoothing thin film 5 on the land flows into the groove completely and thereby the surface of medium 1 is flattened without leaving the smoothing thin film 5 on the land.

Thereafter, the laser spot is moved in the radius direction of the medium 1 and the smoothing thin film 4 on each land is then heated. Thereby, the smoothing thin film 5 on the land is removed and the groove is filled with the thin film material as illustrated in FIGS. 3(d) to 3(g).

As explained above, in this embodiment, since the groove is filled with the smoothing thin film material by heating and fusing this material, the smoothing thin film 5 is formed of a material having a melting point which is lower than that of the other materials also forming the medium 1 so that these other materials are never fused when the smoothing thin film material is fused. Moreover, since the smoothing thin film 5 is heated with a laser beam, a higher light absorbing coefficient is also required. The material satisfying such requirements, Te or a compound which is mainly composed of Te with inclusion of any one of C, Se and S may be listed. Particularly, Te has a melting point of 450° C. which is extremely lower than that of the material forming the magnetic film 4 and assures a higher light absorbing coefficient in the wavelength of the semiconductor laser. Moreover, the compounds such as TeC, TeSe, $TeCS_2$ have excellent oxidation proof characteristics and higher photosensitivity in comparison with discrete Te.

Figure 5:
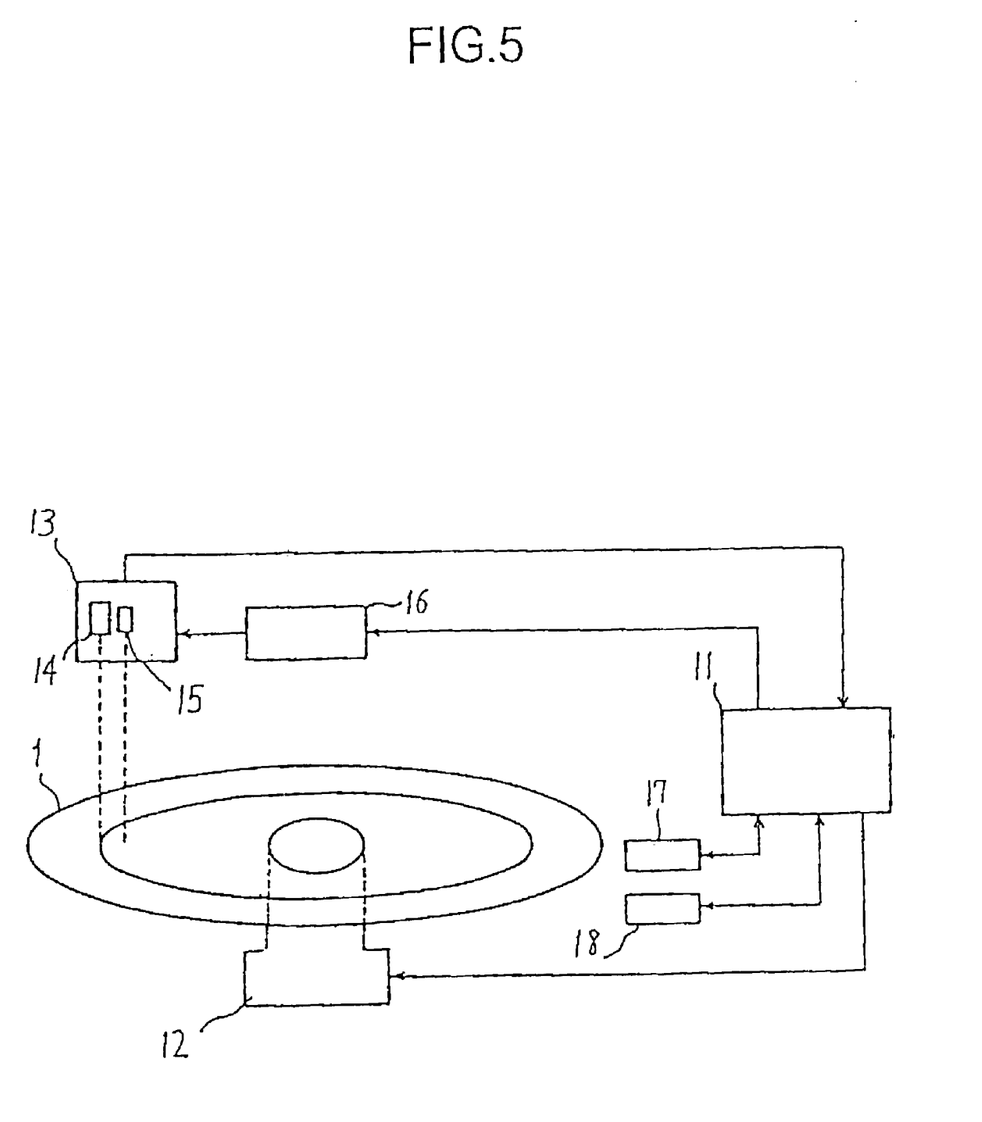
FIG. 5 is a function block diagram of the apparatus for smoothing the surface of disc medium.

FIG. 5 is a function block diagram of a heating apparatus illustrated in FIG. 4.

In FIG. 5, 12 designates a spindle motor to rotate a disc medium 1. 13 designates a laser unit provided with a heating laser 14 and a tracking laser 15. 16 designates an actuator for driving the laser unit 13 in the radius direction of disc 1.

Figure 6:
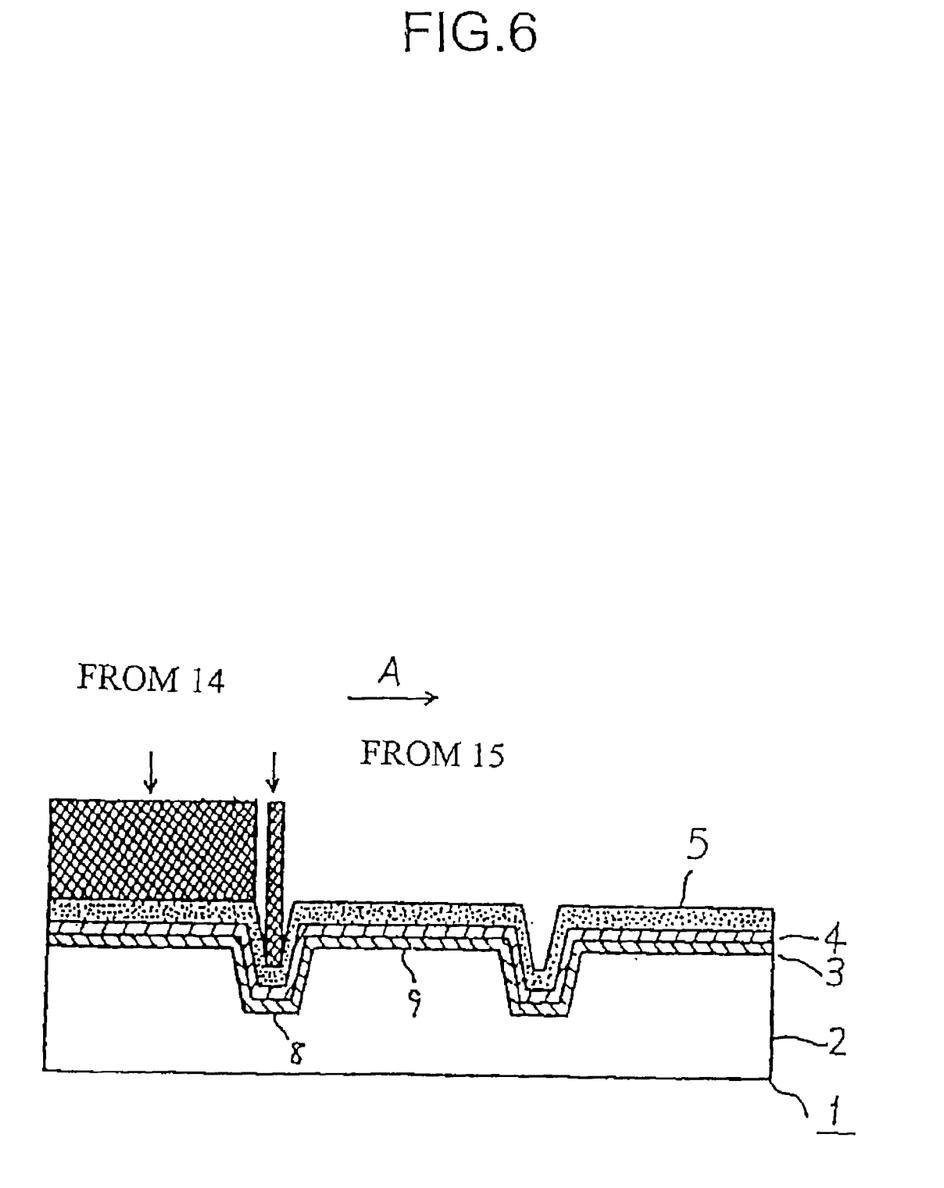
FIG. 6 is a diagram indicating the principle of positioning of the laser spot.

Moreover, as illustrated in FIG. 6, an interval between the laser beam of heating laser 14 and the laser beam of tracking laser 15 is adjusted to become equal to an interval d between the land 8 and groove 9 and moreover the tracking laser 15 is allocated before the heating laser 14 for the moving direction of the actuator 13 indicated with the arrow marked A. Namely, when the laser beam of the tracking laser 15 radiates the groove 9, the laser beam of heating laser 14 and the land 8 overlap with each other.

17 designates a timer which is reset when it counts up the preset time of the preset heating laser 14 for radiation on the land. 18 designates a counter to which the number of lands of disc medium 1 is set and this preset value is subtracted each time when the timer 17 is reset. Namely, this counter is reset when the number of times of reset of timer is matched with the number of lands of the disc medium 1.

A controller 11 determines, when detection of reset of the timer 17 occurs, that the groove filling process being executed is completed and drives the actuator 15 in the direction of the arrow marked A of FIG. 6 in order to move the laser beam of heating laser 14 to the neighboring groove. The controller 11 determines, when it is detected that the laser beam of tracking laser 15 radiates the groove 9, that the laser beam of heating laser 14 is located on the land 8 and it stops operation of actuator 16 and starts again the operation of timer 17. Moreover, when the controller 11 detects that a value of counter 18 is 0, it determines that all grooves on the disc 1 are filled and instructs the heating laser 15 to stop radiation to the land. In the above example, since the actuator 15 is moved in an interval of constant time, the amount of heat received from the laser fluctuates among the lands due to the difference in the length of the circumferential direction. Therefore, it is allowed that the number of rotations of spindle motor 12 is counted and the actuator 15 is moved in every constant number of rotations.

A protection film 6 is composed of a discrete carbon or a compound including carbon. For example, WC, SiC, B4C, carbon including hydrogen and a diamond-like carbon (DLC) that is noted in such a point as having higher hardness may be listed. The protection film 6 is preferably formed with the sputtering method such as the magnetron sputtering method or the like and the adequate film forming condition, for example, is that the film forming temperature is 20° C. to 100° C. and Ar gas pressure is 1 to 10 mTorr. Moreover, the other film forming method, for example, the vacuum evaporation method, ion beam sputtering method or the like is substituted for the sputtering method explained above. Thickness of the protection film 6 depends on various factors and is determined within a wider range but is preferably in the range of 5 nm to 20 nm.

A lubricating film 7 is composed of a fluorocarbon resin-based material and has the thickness of 0.5 nm to 2 nm. The lubricating film 7 is formed in such a manner that a film of lubricant is formed on the medium when the medium 1 is soaked into the solution including the above material. Thickness of the lubricating film 7 depends on the concentration of material in the solution and the rate of speed of removal of the medium from the solution.

Figure 7:
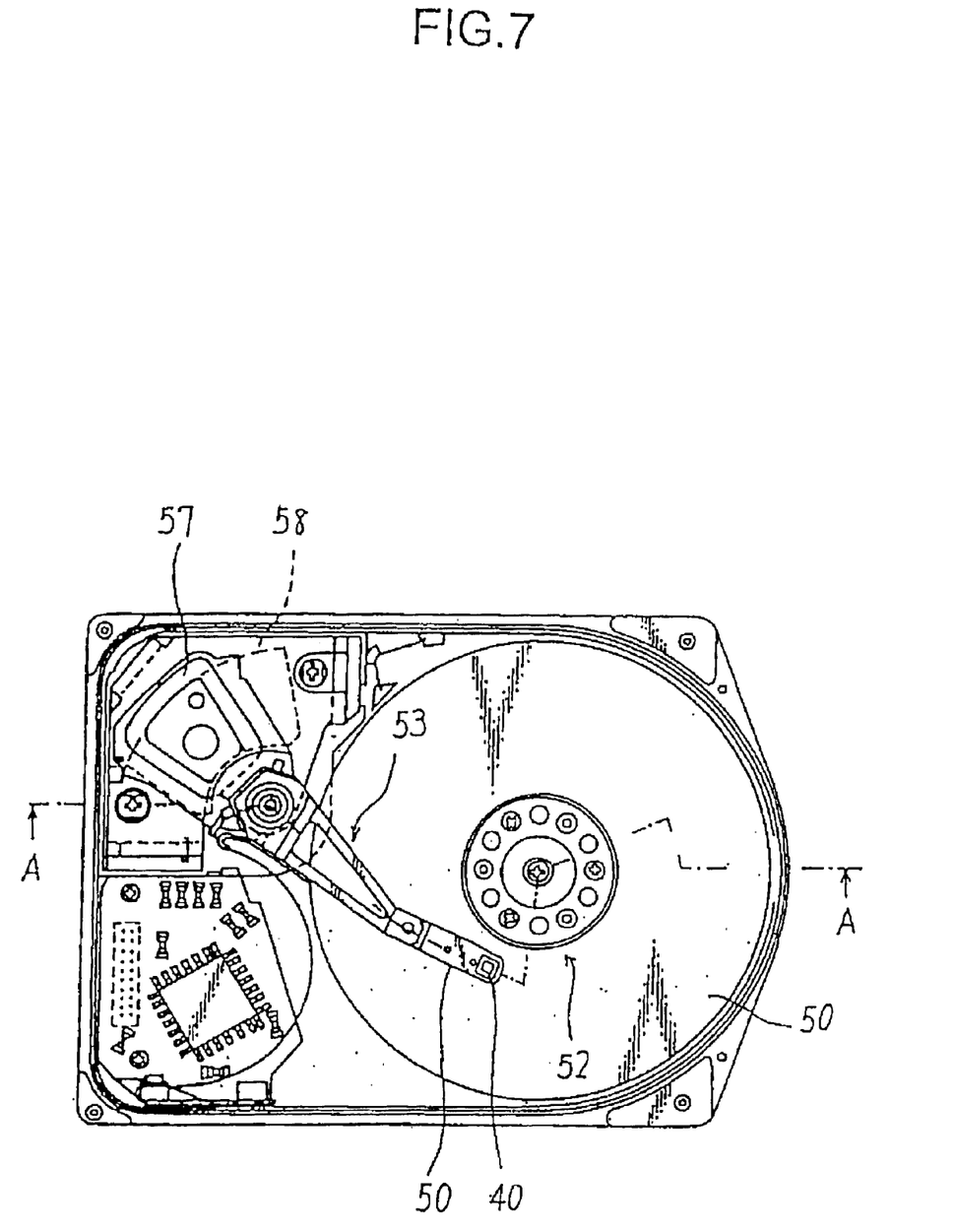
FIG. 7 is a plan view of a magnetic disc apparatus comprising a disc medium of the present invention.
Figure 8:
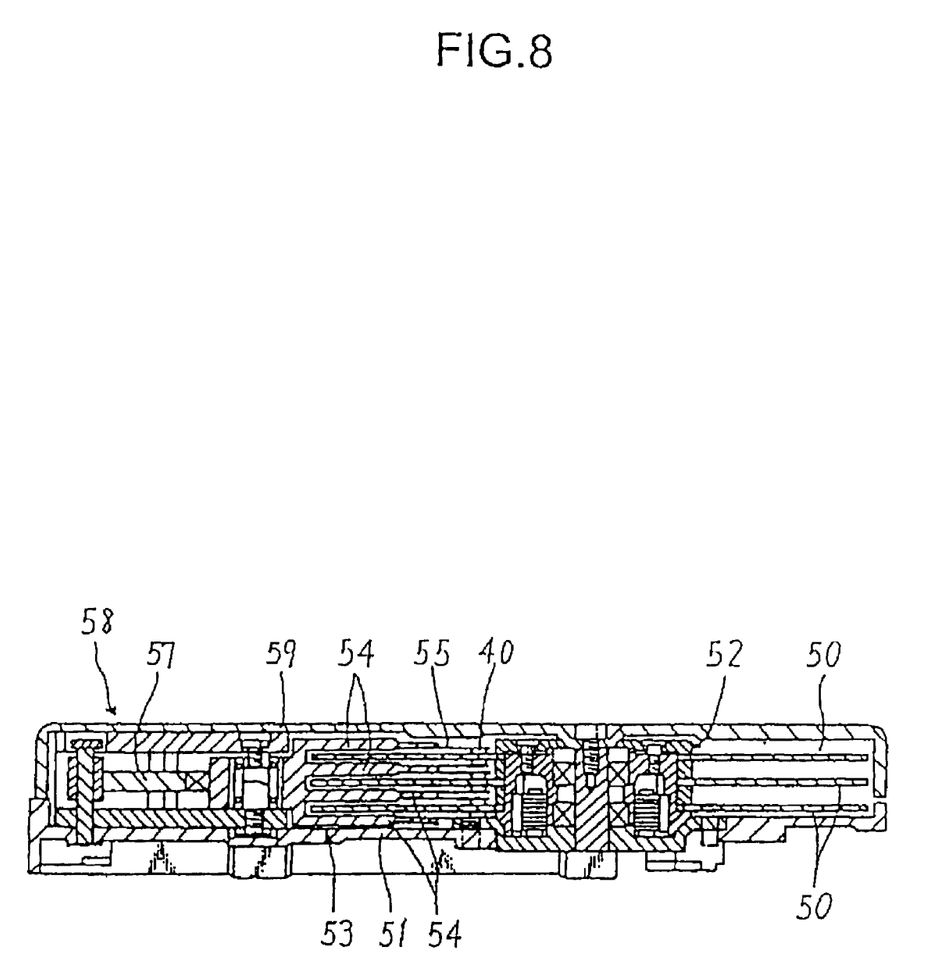
FIG. 8 is a cross-sectional view of the magnetic disc apparatus illustrated in FIG. 7.

Moreover, the present invention relates to a magnetic disc apparatus comprising a magnetic memory medium explained above and an example thereof is illustrated in FIG. 7 and FIG. 8. FIG. 7 is a plan view of the magnetic disc apparatus of the present invention under the condition that a cover is removed, while FIG. 8 is a cross-sectional view along the line A—A of FIG. 7.

In these figures, 50 designates a magnetic disc which is driven with a spindle motor 52 provided on a base plate 51. In this embodiment, three magnetic discs are provided.

53 designates an actuator that is supported on the base plate 51 to freely rotate. At one end of the actuator 53, a plurality of head arms 54 extending in the direction parallel to the recording surface of the magnetic disc 50 are formed. At one end of the head arm, a spring arm is mounted. A slider 40 is mounted via an insulation film not illustrated to a flexure part of the spring arm 55. At the other end of actuator 53, a coil 57 is mounted.

On the base plate 51, a magnetic circuit 58 formed of a permanent magnet and a yoke is provided and the coil 57 is allocated within the magnetic gap of the magnetic circuit 58. A voice coil motor (VCM) is formed of the magnetic circuit 58 and coil 57. Moreover, the upper part of the base plate 51 is covered with a cover 59.

Operations of the magnetic disc apparatus will be explained below. When the magnetic disc 50 is not operated, the slider 40 stops in contact with the saving zone of the magnetic disc 50. Next, when the magnetic disc apparatus 50 is rotated with the spindle motor 52, the slider 40 floats from the disc surface keeping a small gap with the air flow generated due to rotation of the magnetic disc 50. When a current flows into the coil 57 while the slider is floated, a propulsive force is generated in the coil 57 and thereby the actuator 53 rotates. Accordingly, the slider 40 moves onto the predetermined track of the magnetic disc 50 to conduct data reading and writing operations.

Since the groove is formed on the magnetic disc 50 in this magnetic disc apparatus, it can effectively control track edge noise. Moreover, the groove is filled with the smoothing thin film and thereby the surface of magnetic disc 50 becomes flat. Therefore, the air flow at the magnetic disc surface generated with rotation of the magnetic disc is smoothed to assure the stable floating of the slider 40.

Figure 9:
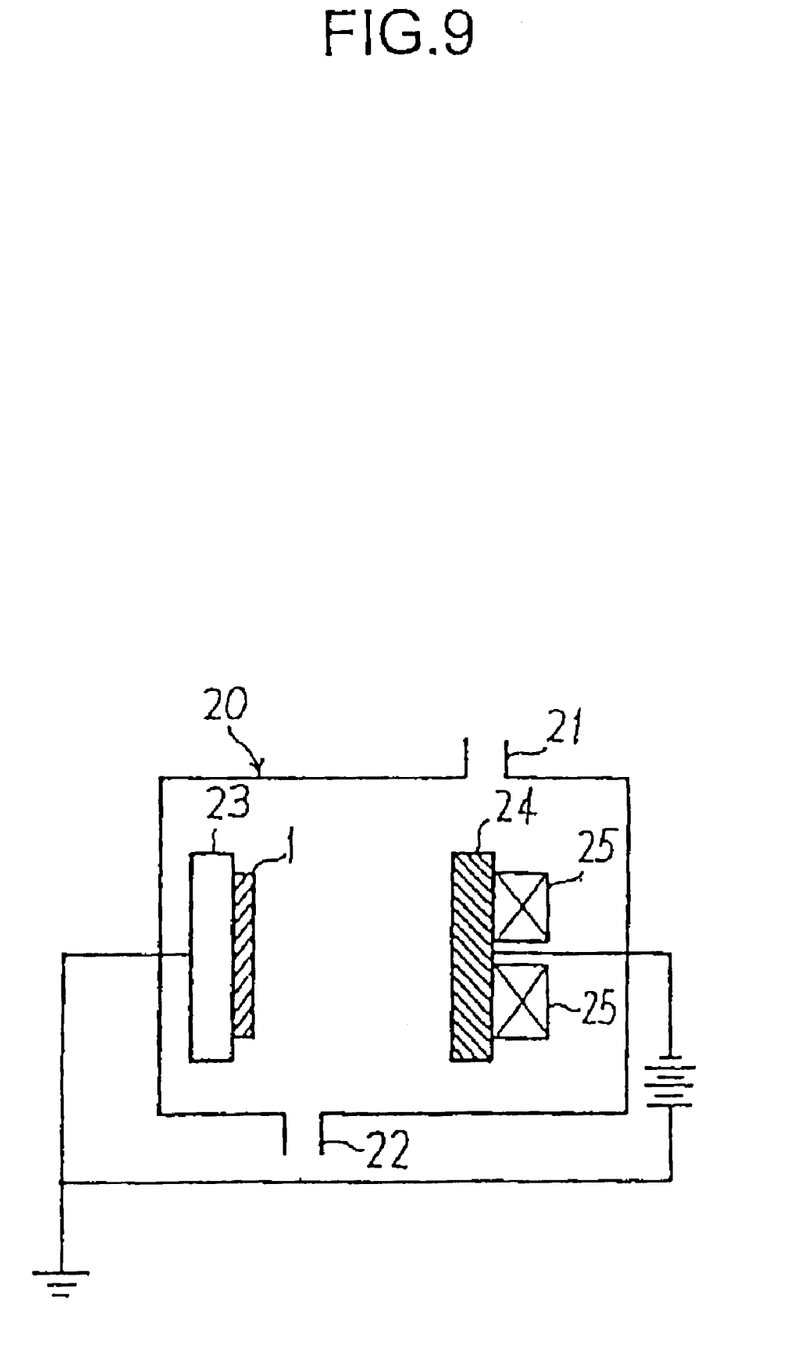
FIG. 9 is a diagram illustrating a sputtering apparatus.

In this embodiment, a magnetic memory medium having the cross-section illustrated in FIG. 2 has been manufactured under the conditions explained below. In this embodiment, the DC magnetron sputtering apparatus 10 as illustrated in FIG. 9 has been used to form the underlayer film 3, magnetic film 4, smoothing thin film 5 and protection film. As illustrated in the figure, the sputtering apparatus 30 is provided with a gas supply port 21 for introducing gas into a sputtering chamber, an exhaust port 22, a susceptor 23 for supporting the disc substrate, a garget 25 and a magnet 25.

The substrate 2 is composed of a glass disc of 2.5 inches and the groove 8 is formed on this disc. The groove 8 is formed in the process that a resist is formed on the surface of glass disc, thereafter the resist is patterned with an exposing apparatus and the groove forming surface not covered with the resist is planed with RIE process. In this embodiment, the groove 8 has the depth of 60 nm and width of 0.3 $\mu$m, while the land has the width of 2.7 $\mu$m. Here, a total value 3.0 $\mu$m of the land width and groove width becomes the track pitch of the magnetic memory medium of this embodiment. In the substrate of this embodiment, the texture process is not executed.

The underlayer 3 is a discrete layer of Cr and this film has been formed, after the sputtering chamber is evacuated to $1\times10^{-8}$ Torr, on the substrate 2 in the thickness of 20 nm under the condition that the substrate temperature is 250° C., Ar gas pressure of sputtering chamber is 5 mTorr and DC power is 300W.

The magnetic film 4 is a discrete layer of CoCrPtTa and is formed on the underlayer 3 in the thickness of 20 nm under the condition that the Ar gas pressure in the sputtering chamber is 5 mTorr and DC power is 200W. The composition of magnetic film 4 in this embodiment is that cobalt is 80 at %, chromium is 16 at %, platinum is 12 at % and tantalum is 2 at %.

The smoothing thin film 5 is formed by moving the substrate 2 to the other sputtering apparatus because the gas to be introduced into the sputtering chamber is different from that used when the underlayer and magnetic film are formed. The smoothing thin film 5 is formed, after the inside of sputtering chamber is evacuated to $1\times10^{-8}$ Torr, on the magnetic thin film 4 in thickness of 6 nm under the conditions that the substrate temperature is 20° C. and gas pressure in the sputtering chamber is 5 mTorr in the mixing ratio of $CH_4$:Ar of 1:9. After the smoothing thin film 5 is formed, the smoothing process is executed. The smoothing process is conducted by rotating the substrate 2 in the speed of 1000 rpm and the smoothing thin film 5 of each land is irradiated with the semiconductor laser 10 in the wavelength of 790 nm and laser power of 2.5 mW in maximum. As a result of the smoothing process, the smoothing thin film 5 on the land flows onto the groove and the level difference at the surface of medium has been reduced up to 2 nm.

The protection film 6 is formed, after the smoothing process, by returning the medium to the sputtering apparatus where the underlayer 2 and magnetic film 3 have been formed. The protection film 6 is composed of amorphous carbon (aC) and is formed in the thickness of 10 nm, after the inside of sputtering chamber is evacuated to $1\times10^{-8}$ Torr, under the condition that the substrate temperature is 20° C., Ar gas pressue in the sputtering chamber is 5 mTorr and DC power is 400W. With the smoothing process explained above, the level difference at the laminated surface of the protection film 6 is almost eliminated and therefore the protection film 6 is almost flat.

The lubricating film 7 is composed of fluorocarbon and formed in the thickness of 2 nm on the protection film 6.

The magnetic memory medium of the present invention has been manufactured using the material and method explained above. As a result, level difference between the land and groove at the surface is controlled to 2 to 3 nm.

Figure 10:
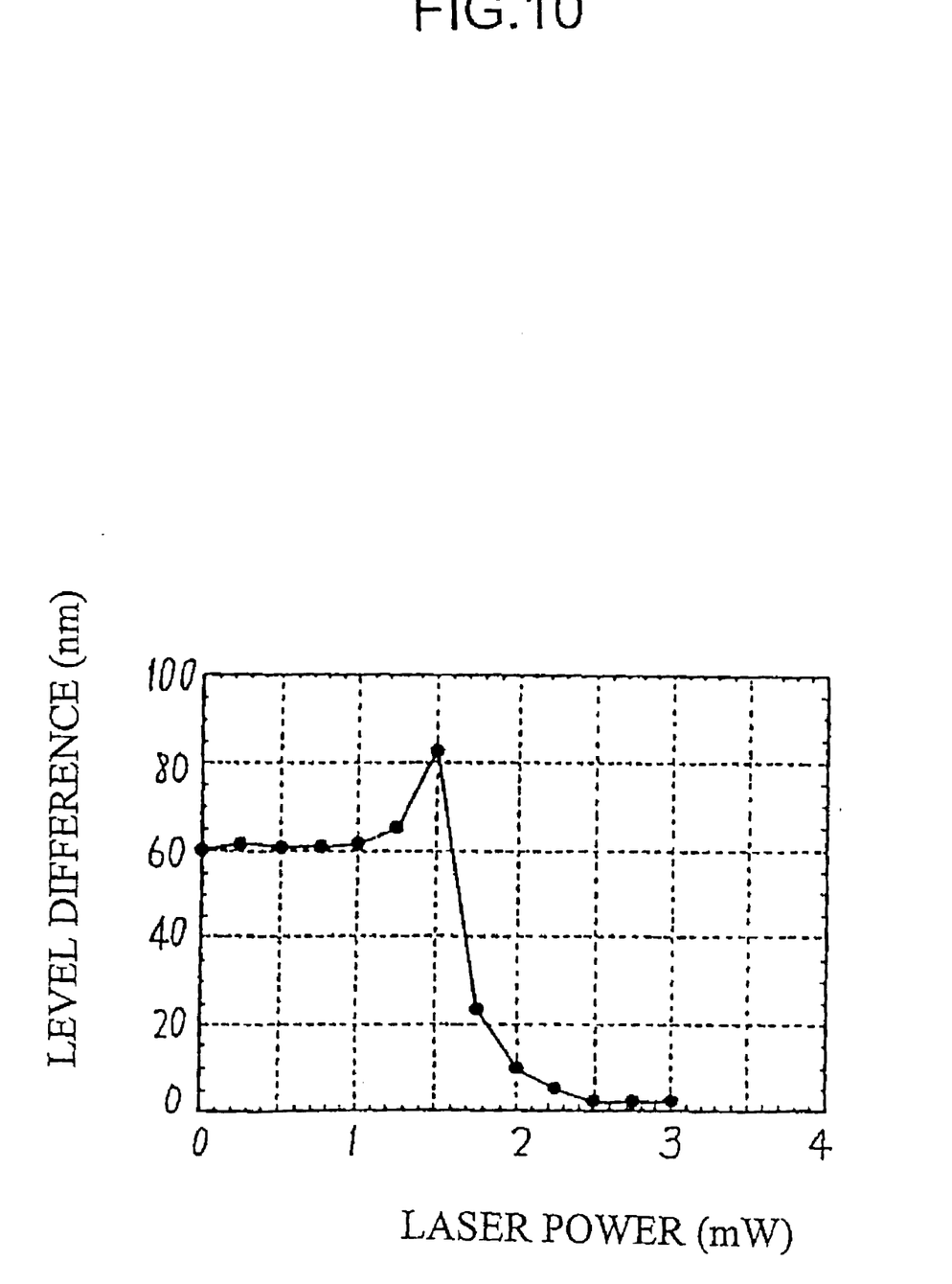
FIG. 10 is a graph indicating the relationship between laser power and level difference at the surface of disc.

FIG. 10 illustrates the relationship between the laser power in the smoothing process and the level difference between the land and groove of the smoothing thin film (TeC). When the laser power is 0 to 1 mW, the TeC film does not fuse and therefore the level difference does not almost change. When the laser power is raised to 1.5 mW, the TeC film starts to fuse and flows into the groove, thereby reducing the level difference. When the laser power becomes 2.5 mW or higher, the TeC film on the land almost moves to the groove and thereby level difference is reduced up to 2 nm.

Figure 11:
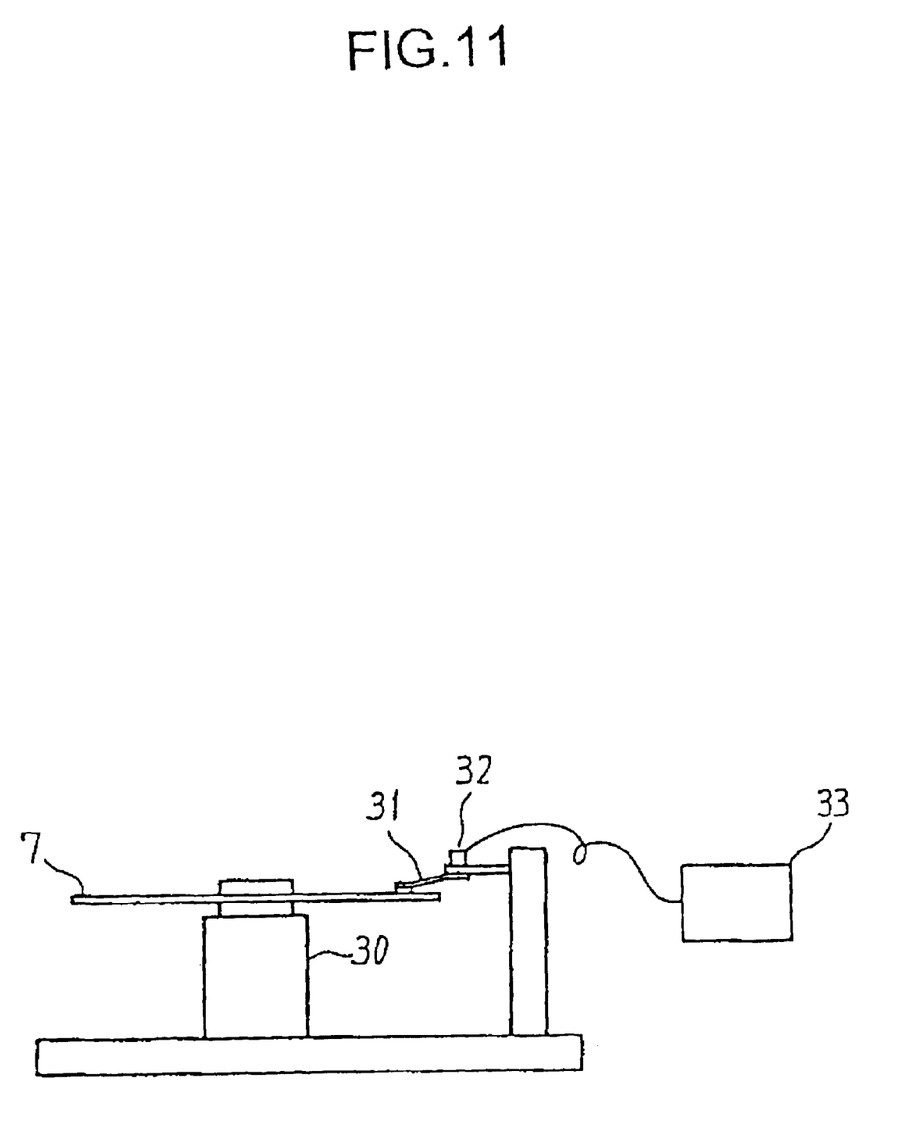
FIG. 11 is a diagram illustrating an apparatus for evaluating the flotation duration time of magnetic head.

FIG. 11 illustrates an apparatus for detecting a crash of a disc medium and a head, comprising an air spindle 30 for rotating a medium to be tested, a suspension 32 for supporting the head, an AE sensor 32 for sensing the crash of medium and head, an amplifier for amplifying a signal of AE sensor and a filter 33. The results illustrated in FIG. 12 and FIG. 14 has been obtained by evaluating a disc medium using the apparatus of FIG. 11 under the condition that circumferential rate of head is 10 m/S and head flotation amount is 20 nm.

Figure 12:
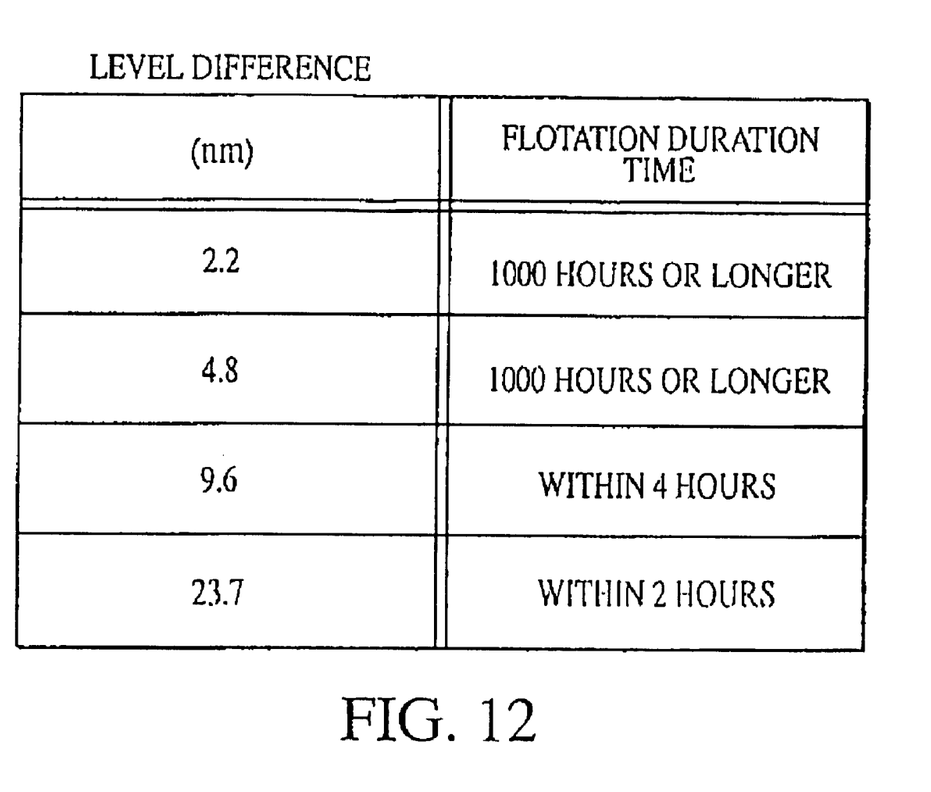
FIG. 12 is a diagram indicating flotation duration time of head for medium in the present invention.

FIG. 12 illustrates the results of the relationship between the level difference between the land and the groove at the surface of the disc medium and the flotation duration time of the head. As is apparent from the Table 1, when the medium has a level difference of 5 nm or less, a collision with the head does not occur and the head can float for 1000 hours or longer. Meanwhile, when the medium has a level difference of 6 nm or more, a crash occurs within several hours from the flotation of the head. In other words, the head can float for only a short period. From the results of FIG. 12, it can be understood, to obtain the stable floating of head, that the level difference between the land and the groove is set to 5 nm or less at the surface of medium.

Figure 1:
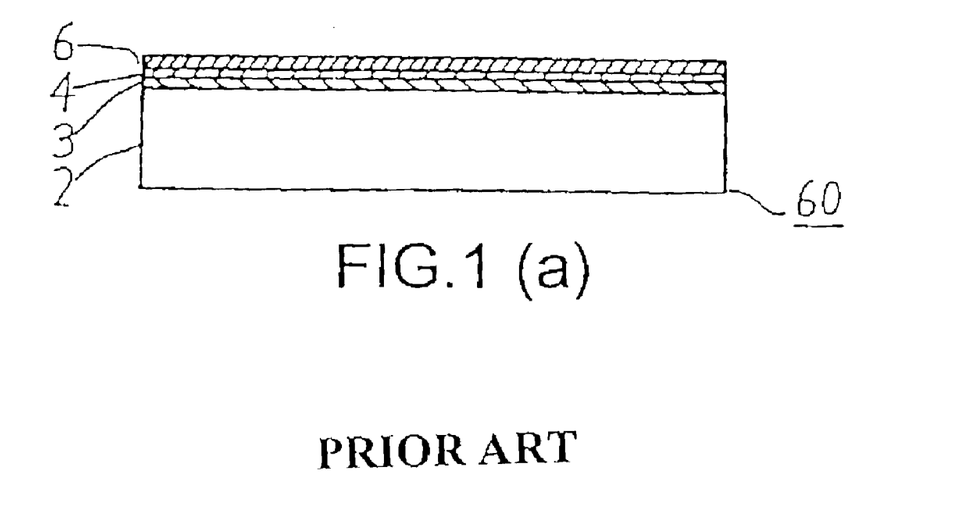
FIGS. 1(a) and 1(b) are cross-sectional views of a magnetic disc medium of the related art.
Figure 13:
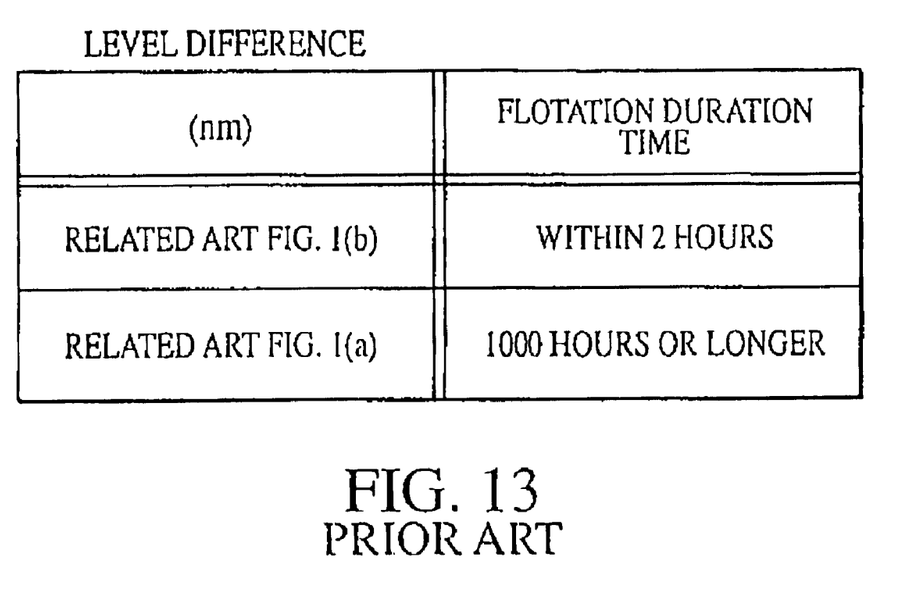
FIG. 13 is a diagram indicating flotation duration time of heat for medium in the related art.

FIG. 13 illustrates a head floating duration time for a disc medium of the related art illustrated in FIG. 1. Since the groove is not formed on the substrate in the medium of FIG. 1(a), the surface is flat and the head can realize the floating of 1000 hours or longer. Meanwhile, in the case of medium illustrated in FIG. 1(b) wherein the groove is formed on the substrate, a crash has been generated within only hours.

From the result of FIG. 13 and FIG. 12, it can be understood that the flotation duration time identical to that of the flat medium on which the groove is never formed can be obtained because the magnetic memory medium of the present embodiment has the level difference of only 2 nm between land and groove.

INDUSTRIAL APPLICABILITY OF THE INVENTION

The magnetic memory medium of the present invention can reduce track edge noise because a magnetic film is laminated on the substrate where the groove is formed and the track is magnetically isolated. As a result, track density can be enhanced. Moreover, since the magnetic memory medium of the present invention has a flat surface, air flow at the surface of medium is not disturbed and thereby stable floating of head can be attained. As a result, head flotation can be reduced and thereby line density can be enhanced.

Accordingly, the present invention enables enhancement of both track density and line density to realize reduction in size and large-capacity of the magnetic memory medium.

What is claimed is:

1. A magnetic memory disc medium comprising:
    a substrate on which a groove and a land are concentrically formed;
    a continuous magnetic film laminated on said substrate and at least partially filling said groove; and
    a non-magnetic film deposited on said magnetic film and filling said groove to a position higher than the land of the substrate;
    wherein a level difference between an upper surface of the magnetic film on the land and an upper surface of the non-magnetic film filling the groove is 5 nm or less.

2. A magnetic memory disc medium according to claim 1, wherein said non-magnetic film on the groove is deposited up to a height substantially equal to said magnetic film on the land.

3. A magnetic memory disc medium according to claim 1, wherein said non-magnetic film is formed of a material having a melting point which is lower than that of the material forming said magnetic film.

4. A magnetic memory disc medium according to claim 3, wherein said non-magnetic film includes at least Te.

5. A magnetic disc apparatus comprising:
    a magnetic disc including a substrate on which a groove and a land are concentrically formed, a continuous magnetic film laminated on said substrate and at least partially filling said groove, and a non-magnetic film deposited up to a height higher than the land of said substrate on said magnetic film and filling said groove such that a level difference between an upper surface of the magnetic film on the land and an upper surface of the non-magnetic film filling the groove is 5 nm or less;
    a spindle motor for rotating said magnetic disc;
    a head for writing or reading data to or from said magnetic disc; and
    an actuator for moving said head in a radius direction of said magnetic disc.

6. A magnetic disc apparatus according to claim 5, wherein said non-magnetic film on the groove of said magnetic disc is deposited up to a height substantially equal to said magnetic film on the land.

7. A magnetic memory disc medium comprising:
    a substrate on which a groove and a land are formed;
    a magnetic film laminated on said substrate; and
    a non-magnetic film deposited on said magnetic film on said groove up to a position higher than the land of the substrate;
    wherein said non-magnetic film includes at least Te.

8. A magnetic memory disc medium according to claim 7, wherein said non-magnetic film on the groove is deposited up to a height substantially equal to said magnetic film on the land.

9. A magnetic memory disc medium according to claim 7, wherein said non-magnetic film is formed of a material having a melting point which is lower than that of the material forming said magnetic film.

10. A magnetic memory disc medium according to claim 7, wherein a level difference between an upper surface of the magnetic film on the land and an upper surface of the non-magnetic film filling the groove is 5 nm or less.

11. A magnetic memory disc medium comprising:
    a substrate on which a groove and a land are concentrically formed;
    a magnetic film laminated on said substrate; and
    a non-magnetic film deposited on said magnetic film and filling said groove to a position higher than the land of the substrate;
    wherein a level difference between an upper surface of the magnetic film on the land and an upper surface of the non-magnetic film filling the groove is 5 nm or less, and
    wherein said non-magnetic film includes at least Te and is formed of a material having a melting point which is lower than that of the material forming said magnetic film.

* * * * *